H. W. MILLAR.
Lamp Chimney.
No. 39,301.
Patented July 21, 1863.
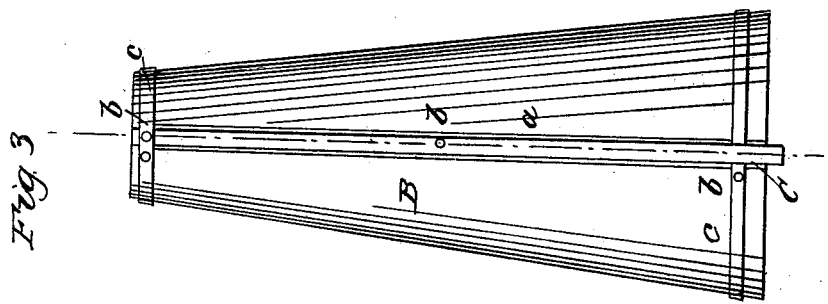
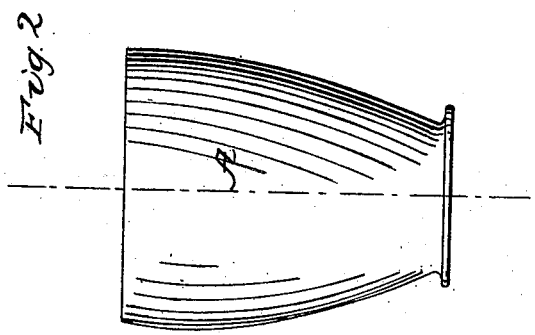
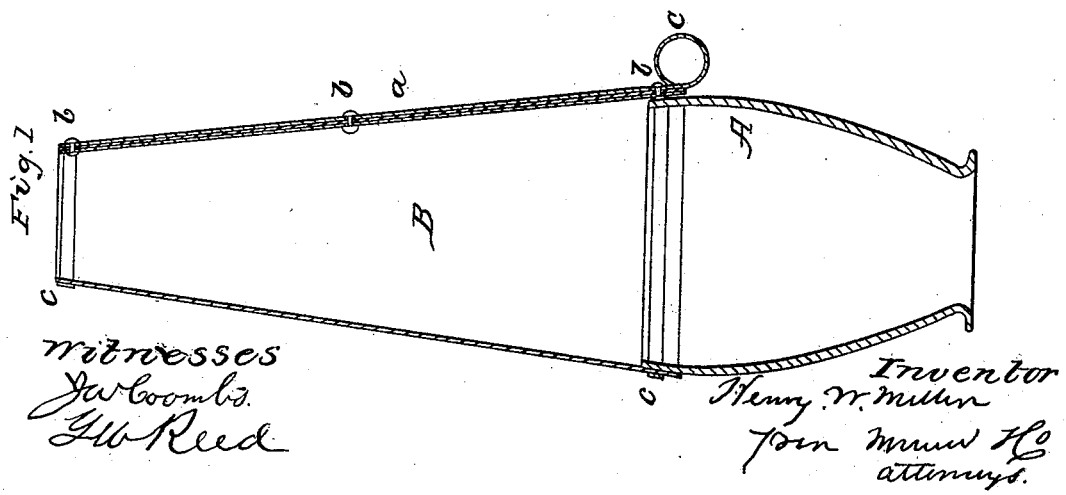

UNITED STATES PATENT OFFICE.

HENRY W. MILLAR, OF UTICA, NEW YORK.

IMPROVEMENT IN CHIMNEYS FOR LAMPS.

Specification forming part of Letters Patent No. 39,301, dated July 21, 1863.

*To all whom it may concern:*

Be it known that I, HENRY W. MILLAR, of Utica, in the county of Oneida and State of New York, have invented a new and Improved Chimney for Lamps; and I do hereby declare that the following is a full, clear, and exact description of the same, reference being had to the accompanying drawings, making a part of this specification, in which—

Figure 1 is a vertical central section of my invention; Fig. 2, a detached external view of the lower part of the same; Fig. 3, a detached external view of the upper part of the same.

Similar letters of reference indicate corresponding parts in the several figures.

This invention consists in constructing the chimney in two separate parts, one of glass and the other of mica, and having the upper part fitted on the lower part in such a manner that it may be readily removed, so as to render the wick accessible for trimming and lighting, the upper part of the chimney being of mica and the lower part of glass, whereby the chimney is prevented from being broken by unequal expansion, as is the case with the ordinary chimneys, which are constructed entirely of glass, and the chimney at the same time, in consequence of being constructed wholly of transparent materials, not obstructing any of the rays of light emitted from the flame, as the combined glass and metal chimneys.

To enable those skilled in the art to fully understand and construct my invention, I will proceed to describe it.

A represents the lower glass portion of the chimney, which may be of any proper form, but which will probably be made to correspond in shape with that of the lower part of ordinary glass chimneys. (See Figs. 1 and 2.)

B represents the upper part of the chimney, which is constructed of mica bent in conical form and secured at its edges by a metal clamp formed of a thin strip, *a*, at the outer side of the chimney, and through which strip and the lapped edges of the mica rivets *b* pass. The upper part, B, of the chimney may be of any desired length, and its lower end is of such diameter that it may fit snugly on the upper end of the lower glass part, A, of the chimney, as shown clearly in Fig. 1. The strip *a* may be sufficiently long to admit of being bent and curved to form a handle, C, which is grasped by the fingers when the part B is to be removed from or adjusted upon A. The upper and lower ends of the part B are encompassed by light metal bands *c*. By this arrangement the lower glass part, A, of the chimney is allowed to expand freely under the heat of the flame without danger of fracture, and the upper part, B, in consequence of being constructed of mica, may heat to any degree possible under the action of the flame without injury. The upper part of a chimney heats much more intensely than the lower part, and the entire glass chimneys are liable to fracture from that cause. This contingency led to the invention of the combined metal and glass chimneys, which answer a good purpose as regards non-liability to breakage from unequal expansion; but, while partially obviating that difficulty, they are attended with the objection of obstructing the light in a considerable degree. My invention therefore possesses the advantage of the latter-named chimneys, without having the disadvantage referred to.

Having thus described my invention, I claim as new and desire to secure by Letters Patent, as an improved article of manufacture—

A lamp-chimney constructed of glass and mica, in the manner substantially as herein shown and described.

HENRY W. MILLAR.

Witnesses:
J. TAPPING,
H. S. HASTINGS.